G. P. MORRILL.
Ax-Handle Attachment.

No. 210,703.    Patented Dec. 10. 1878.

Witnesses.
S. N. Piper
John R. Snow

Inventor.
George P. Morrill
by his attorney.
R. H. Eddy

UNITED STATES PATENT OFFICE.

GEORGE P. MORRILL, OF CANTERBURY, NEW HAMPSHIRE.

IMPROVEMENT IN AX-HANDLE ATTACHMENTS.

Specification forming part of Letters Patent No. 210,703, dated December 10, 1878; application filed July 24, 1878.

*To all whom it may concern:*

Be it known that I, GEORGE P. MORRILL, of Canterbury, of the county of Merrimack and State of New Hampshire, have invented a new and useful Ax Head and Handle Attachment; and do hereby declare the same to be described in the following specification and represented in the accompanying drawings, of which—

Figure 1:
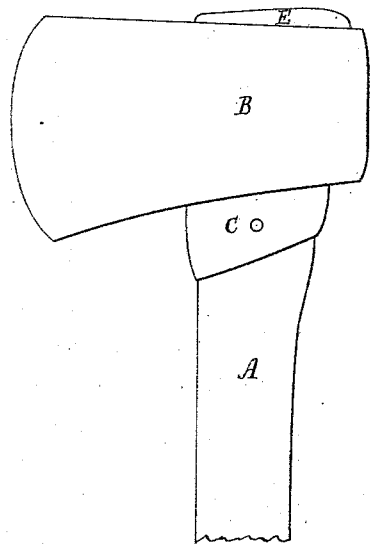
Figure 2:
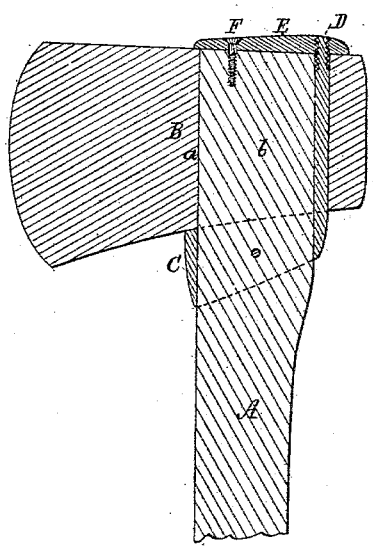
Figure 3:
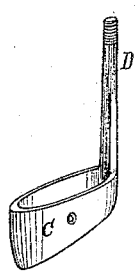

Figure 1 is a side view, and Fig. 2 a longitudinal section, of an ax head and handle provided with the said attachment. Fig. 3 is a perspective view of the collar and screw constituting part of the said attachment.

Such attachment consists, mainly, in a collar, screw, and nut as applied to the ax head and handle, substantially as hereinafter described and as represented.

In the drawings, A denotes the ax-handle, and B the head, the latter having an eye, $a$, of the usual form to receive the tenon $b$ of the handle. There is driven upon the handle, next the base of the tenon, an elongated collar, C, provided with a screw, D, that projects from it at one end of it, and with the tenon goes through the eye of the ax-head. On this screw, where projected beyond the eye, there is screwed an elongated plate or nut, E, which covers the end of the eye and extends across, or nearly across, the upper end of the head.

To keep the nut from accidentally working loose on its screw or out of place, a common headed screw, F, is inserted through it and screwed into the ax-handle. Furthermore, the collar is held in place by one or more rivets going through it and the ax-handle transversely. The shank of the screw D is arranged alongside of the back of the tenon of the handle.

By means of the attachment the tenon and handle are not only greatly strengthened where most liable to become broken while the ax may be in use, but the head is maintained firmly in place on the handle.

I sometimes arch or round the upper end of the collar somewhat to enable the angle of "set" of the head with the handle to be varied, as occasion may require.

My invention, though somewhat analogous to the ax-handle attachment shown in the United States Patent No. 70,284, differs materially therefrom, inasmuch as I have, in connection with the collar C and screw D, a nut to screw on the latter and extend across and cover the eye of the ax-head and screw against the head, and such nut has a hole through it to receive the fastening-screw F, whereby the nut is prevented from accidentally working loose on the screw D.

I claim—

The herein-described device for attaching and clamping axes to their handles, the same consisting of the collar located on the handle below and in contact with the lower surface of the ax, the bolt passing up through the ax-eye, the plate screwed as a nut upon the end of bolt, and the screw driven into the head of the helve and keeping the plate from turning, all constructed, arranged, and operating as specified.

GEO. P. MORRILL.

Witnesses:
 R. H. EDDY,
 JOHN R. SNOW.